(12) United States Patent
Chen

(10) Patent No.: US 9,234,993 B2
(45) Date of Patent: Jan. 12, 2016

(54) BACKLIGHT MODULE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/326,993

(22) Filed: Jul. 9, 2014

(65) Prior Publication Data

US 2015/0023050 A1   Jan. 22, 2015

(51) Int. Cl.
*F21V 8/00* (2006.01)
*G02F 1/1335* (2006.01)

(52) U.S. Cl.
CPC ........ *G02B 6/0008* (2013.01); *G02F 1/133609* (2013.01); *G02F 2001/133607* (2013.01); *G02F 2201/02* (2013.01)

(58) Field of Classification Search
CPC .. G02B 6/0008; G02B 6/0005; G02B 6/0028; G02B 6/0018; G02B 6/0068; F21V 7/04; F21V 8/00; F21V 2008/001; F21V 2008/005; F21V 2008/006; F21V 17/164; F21V 23/0464; F21S 11/00; F21S 11/02; G02F 2001/133618; G02F 2001/13324; G02F 2001/133626
See application file for complete search history.

(56) References Cited

U.S. PATENT DOCUMENTS

| 6,655,825 B2 * | 12/2003 | Muthu ................. G02B 6/0028 362/555 |
| 2006/0007702 A1 * | 1/2006 | Hsieh ................... G02B 6/0008 362/611 |
| 2013/0081610 A1 * | 4/2013 | Eichelberger ......... F24C 15/008 126/273 R |
| 2013/0335989 A1 * | 12/2013 | Sato ......................... F21V 9/16 362/510 |

* cited by examiner

*Primary Examiner* — Anne Hines
(74) *Attorney, Agent, or Firm* — Novak Druce Connolly Bove + Quigg LLP

(57) ABSTRACT

A backlight module includes a light source unit, an optical fiber, a diverging lens and a light guide unit. The light source unit includes a first light source emitting red light, a second light source emitting green light and a third light source emitting blue light. The optical fiber includes a first, second, and third incident branches and a light output portion. The three incident branches converge into the light output portion and are aligned with the three light sources to guide and mix red, blue, and green light to form white light. The diverging lens is aligned with the light output portion to receive and diverge the white light. The light guide unit faces the diverging lens to receive the white light.

10 Claims, 1 Drawing Sheet

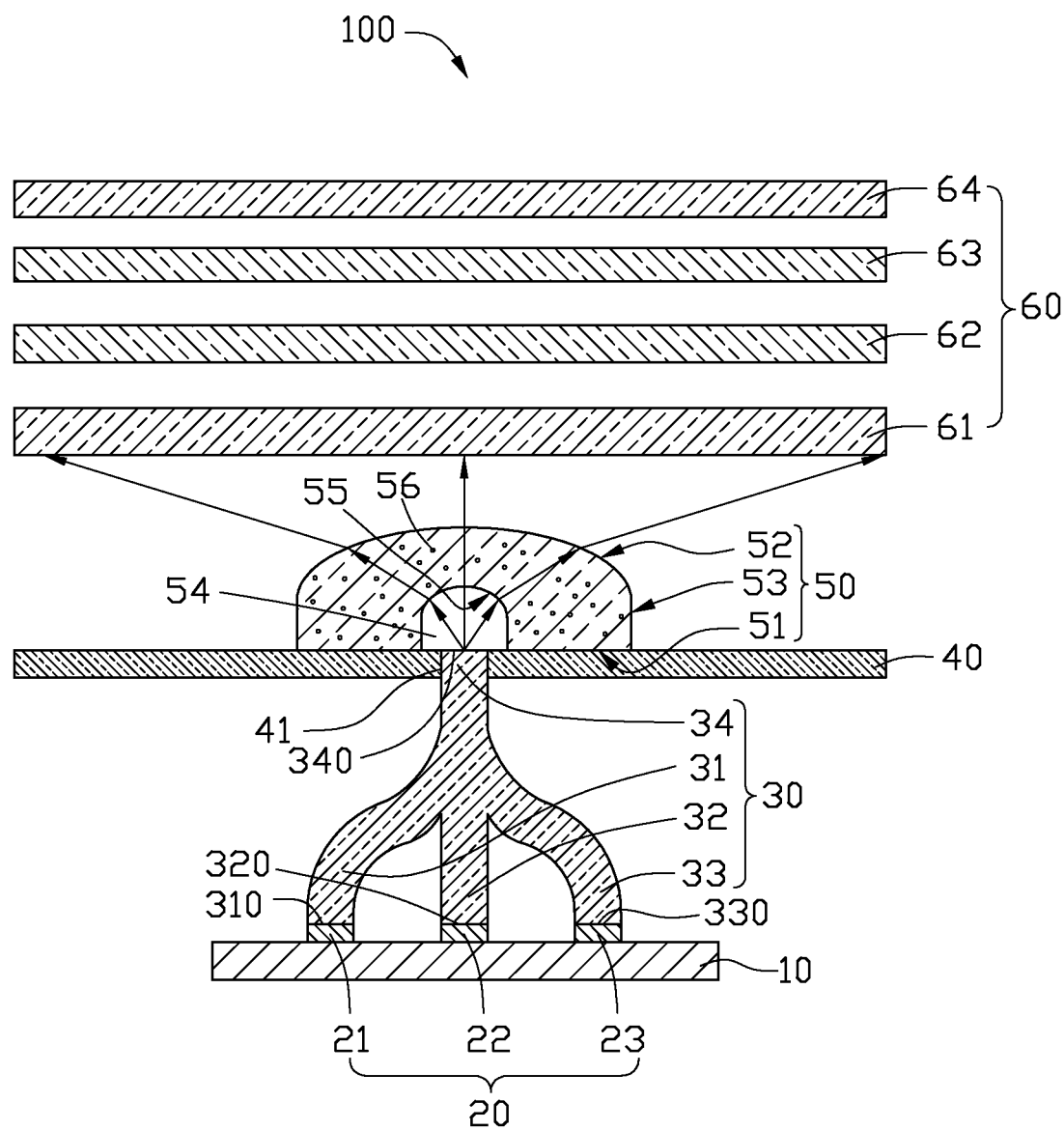

BACKLIGHT MODULE

FIELD

The subject matter herein generally relates to a backlight module.

BACKGROUND

A backlight module emitting approximate white light is used to illuminate a liquid crystal display (LCD) device to display actual images. The backlight module converts linear light sources such as cold cathode fluorescent lamp (CCFL), or point light sources such as light emitting diodes (LEDs), into area light sources having high uniformity and brightness. If LEDs are introduced as point light sources to the backlight module, the LEDs usually employ specific phosphor powder packed with light emitting diode chips for emitting the approximate white light.

BRIEF DESCRIPTION OF THE DRAWINGS

Implementations of the present technology will now be described, by way of example only, with reference to the attached figure.

The figure is a diagrammatic view of an embodiment of a backlight module.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like. The references to "an" or "one" embodiment are not necessarily to the same embodiment, and such references mean "at least one." The references "a plurality of" and "a number of" mean "at least two."

The present disclosure is described in relation to a backlight module. The backlight module comprises a light source unit, an optical fiber, a diverging lens, and a light guide unit. The light source unit comprises a first light source emitting red light, a second light source emitting green light, and a third light source emitting blue light. The optical fiber comprises three incident branches and a light output portion. The three incident branches and the light output portion are interconnected with each other. The incident branches correspond to the first, second, and third light source respectively to receive and mix emitted light. The diverging lens is configured to receive and diverge the mixed light emitting out from the optical fiber through the light output portion. The light guide unit is arranged at a light output side of the diverging lens to receive and balance the emitted light.

The figure illustrates an embodiment of a backlight module 100. The backlight module 100 includes a substrate 10, a light source unit 20, an optical fiber 30, a reflective sheet 40, a diverging lens 50, and a light guide unit 60.

In at least one embodiment, the substrate 10 can be a substantially rectangular plate. The substrate 10 can be configured to support the light source unit 20.

The light source unit 20 is mounted on the substrate 10. The light source unit 20 includes a first light source 21, a second light source 22, and a third light source 23. The first, second, and third light sources 21, 22, and 23 are arranged in a straight line and are spaced from each other. In one embodiment, the first, second, and third light sources 21, 22, and 23 can be light emitting diodes. The first light source 21 is configured to emit red light. The second light source 22 is configured to emit green light. The third light source 23 is configured to emit blue light.

The optical fiber 30 is configured to receive and mix light emitted from the light source unit 20. The optical fiber 30 includes a first incident branch 31, a second incident branch 32, a third incident branch 33, and a light output portion 34. The three incident branches 31, 32, and 33 converge into the light output portion 34 and each has a free end 310, 320, or 330 away from the light output portion 34. The three free ends 310, 320, and 330 of the first , second, and third incident branches 31, 32, and 33 are aligned with the first , second, and third light source 21, 22, and 23 respectively. The light output portion 34 has a light output end 340 at a distal portion away from the three free ends (310, 320, or 330). Red light emitted from the first light source 21 enters the optical fiber 30 through the free end 310 of the first incident branch 31. Green light emitted from the second light source 22 enters the optical fiber through the free end 320 of the second incident branch 32. Blue light emitted from the third light source 23 enters the optical fiber through the free end 330 of the third incident branch 33. Red, green, and blue light is guided into the light output portion 34 and is mixed to form white light in the light output portion 34. The white light emits from the optical fiber 30 through the light output end 340. In at least one embodiment, the optical fiber 30 can be made of an elastic material.

The reflective sheet 40 defines a through hole 41. The light output end 340 is secured in the through hole 41 and is exposed at the through hole 41. In one embodiment, the through hole 41 is defined at a central portion of the reflective sheet 40.

The diverging lens 50 is mounted on the reflective sheet 40 and is aligned with the light output end 340 to receive emitted white light. The diverging lens 50 is substantially hemispherical shaped. The diverging lens 50 can be made of transparent material, such as Polymethyl Methacrylate (PMMA), Polycarbonate (PC), silicone, or glass. The diverging lens 50 includes a bottom surface 51, a top surface 52, and a side surface 53. The bottom surface 51 and the top surface 52 are at opposite sides of the diverging lens 50. The side surface 53 is interconnected between the bottom surface 51 and the top surface 52. The bottom surface 51 is a planar surface and contacts the reflective sheet 40. In one embodiment, a recess 54 is defined in a central portion of the bottom surface 51. The diverging lens 50 further includes a concave surface 55 in the recess 54 as a light input surface. The recess 54 is aligned with the light output end 340. In one embodiment, a cross section of the recess 54 is substantially semi-elliptical shaped. The width of the recess 54 is smaller than the height of the recess 54 such that white light emits out of the diverging lens 50 with a larger deflection angle. The top surface 52 is substantially a convex surface. In one embodiment, a number of light-diffusing particles 56 are distributed uniformly in the diverging lens 50. The light-diffusing particles 56 can be made of silicon, glass, PMMA, and the like.

The light guide unit 60 faces the top surface 52 of the diverging lens 50 and the reflective sheet 40. The light guide unit 60 includes a first diffusion sheet 61, a first prism sheet 62, a second prism sheet 63, and a second diffusion sheet 64 arranged in that order along a direction which is away from the diverging lens 50. In at least one embodiment, the first diffusion sheet 61, the first prism sheet 62, the second prism sheet 63, and the second diffusion sheet 64 can be substantially parallel to each other.

When the backlight module 100 is working, the white light enters the diverging lens 50 through the concave surface 55, and emits out of the diverging lens 50 through the top surface 52. In addition, penetrates the first diffusion 61, the first prism sheet 62, and the second prism sheet 63 successively, and finally emits out of the backlight module 100 through the second diffusion sheet 64.

In at least one embodiment, the substrate 10 can be omitted. In this situation, the first, second, and third light sources 21, 22, and 23 are respectively secured at the first, second, and third light input ends 31, 32, and 33 of the optical fiber 30.

In at least one embodiment, the backlight module 100 can include a number of light source units 20, a number of optical fibers 30, and a number of diverging lenses 50. In this situation, the reflective sheet 40 defines a number of through holes 41. Each through hole 41 receives and secures a light output portion 34 of an optical fiber 30. Each light source unit 20 corresponds to an optical fiber 30, and a diverging lens 50.

In at least one embodiment, the recess 54 can be omitted. In this situation, the center of the bottom surface 51 faces the output end 34 of the optical fiber 30. The bottom surface 51 serves as a light incident surface of the diverging lens 50.

In at least one embodiment, a number of microstructures can be formed on the top surface 52 and the side surface 53.

The embodiments shown and described above are only examples. Many details are often found in the art such as the other features of a backlight module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A backlight module comprising:
    a light source unit comprising a first light source configured to emit red light, a second light source configured to emit green light, and a third light source configured to emit blue light;
    an optical fiber comprising a first, a second, and a third incident branch, and a light output portion, the three incident branches converging into the light output portion, the light output portion having a light output end located distally from the three incident branches, each incident branch having a free end, the light output portion having a light output end located distally from the three free ends, wherein the three free ends of the incident branches are aligned with the first, second, and third light source respectively to guide and mix the red, blue and green to form white light;
    a diverging lens aligned with the light output end and configured to receive and diverge the white light emitted out of the optical fiber through the light output portion; and
    a light guide unit facing the diverging lens and configured to receive the white light.

2. The backlight module of claim 1, further comprising a reflective sheet, wherein the reflective sheet defines a through hole, the light output end is secured in the through hole and is exposed at the through hole, and the diverging lens is mounted on the reflective sheet.

3. The backlight module of claim 1, wherein the diverging lens comprises a bottom surface, a top surface, and a side surface, the bottom surface and the top surface are at opposite sides of the diverging lens, the side surface is interconnected between the bottom surface and the top surface, and the bottom surface contacts the reflective sheet.

4. The backlight module of claim 3, wherein a recess defined in a central portion of the bottom surface, the diverging lens further comprises a concave surface in the recess, and the light output end is aligned with the recess.

5. The backlight module of claim 1, wherein a number of light-diffusing particles are distributed in the diverging lens.

6. The backlight module of claim 1, wherein the light guide unit comprises a first diffusion sheet, a first prism sheet, a second prism sheet, and a second diffusion sheet arranged in that order along a direction away from the diverging lens, and the first diffusion sheet faces the top surface.

7. The backlight module of claim 6, wherein the first diffusion sheet, the first prism sheet, the second prism sheet, and the second diffusion sheet are parallel to each other.

8. The backlight module of claim 1 further comprising a substrate configured to support the light source unit.

9. The backlight module of claim 1, wherein the first, second, and third light sources can be light emitting diodes.

10. The backlight module of claim 1, wherein the optical fiber is made of an elastic material.

* * * * *